United States Patent [19]

Sakai et al.

[11] Patent Number: 5,732,152

[45] Date of Patent: Mar. 24, 1998

[54] HANDWRITTEN CHARACTER ENTRY METHOD AND DEVICE HAVING TWO DISPLAY AREAS

[75] Inventors: Satomi Sakai, Kawasaki; Kengo Osawa, Maebashi, both of Japan

[73] Assignee: Fujitsu Limited, Kanagawa, Japan

[21] Appl. No.: 784,306

[22] Filed: Jan. 16, 1997

Related U.S. Application Data

[63] Continuation of Ser. No. 438,083, May 8, 1995, abandoned.

[30] Foreign Application Priority Data

May 31, 1994  [JP]  Japan .................... 6-117310

[51] Int. Cl.⁶ .................................. G06K 9/00
[52] U.S. Cl. ........................... 382/189; 382/311
[58] Field of Search ................. 382/187, 189, 382/313, 310, 311; 345/115, 116, 124; 364/705.03, 709.11

[56] References Cited

U.S. PATENT DOCUMENTS

| | | |
|---|---|---|
| 4,860,372 | 8/1989 | Kuzunuki et al. .................. 382/13 |
| 5,025,484 | 6/1991 | Yamanari et al. .................. 382/61 |
| 5,257,074 | 10/1993 | Kamei ........................... 355/244 |
| 5,305,394 | 4/1994 | Tanaka .......................... 382/13 |
| 5,389,745 | 2/1995 | Sakamoto ........................ 178/18 |
| 5,455,901 | 10/1995 | Friend et al. ................... 395/149 |
| 5,502,461 | 3/1996 | Okamoto et al. .................. 345/173 |

FOREIGN PATENT DOCUMENTS

| | | | |
|---|---|---|---|
| 0511658 | 11/1992 | European Pat. Off. ....... | G06F 3/033 |
| 3629104 | 3/1987 | Germany ................... | G06F 3/033 |
| 61-276076 | 12/1986 | Japan ..................... | 382/311 |

OTHER PUBLICATIONS

English Translation of Japanese 61-276076 to Sugiyama et al., Dec. 1986.

*Primary Examiner*—Andrew Johns
*Attorney, Agent, or Firm*—Nikaido Marmelstein Murray & Oram LLP

[57] ABSTRACT

In an area of a tablet where a handwritten character is written for entry, the result of the recognition of the handwritten character is displayed by replacing the handwritten character written therein; at the same time, the recognition result is also displayed in a display field that can display more characters than can be shown in the handwritten character entry area at one time.

8 Claims, 10 Drawing Sheets

Fig. 7

```
30
┌─────────────────────────────────────────────┐
│                                             │
│  ADDRESS:  │ A B C D E F G H 1415        │  │
│                                             │
│  TELEPHONE:│                             │  │
│                                             │
│  NAME:        │                      │      │
│                                             │
└─────────────────────────────────────────────┘
```

HANDWRITTEN CHARACTER ENTRY METHOD AND DEVICE HAVING TWO DISPLAY AREAS

This application is a continuation of application Ser. No. 08/438,083, filed on May 8, 1995, now abandoned.

BACKGROUND OF THE INVENTION

1. Field of the Invention

The present invention relates to a method and apparatus for entering handwritten characters, wherein handwritten characters entered are recognized and the results of recognition are presented to the user for verification on-screen.

2. Description of the Related Art

Terminals that allow handwritten entries using an input pen or the like are finding widespread use in various fields. In particular, portable handwritten entry terminals are widely used in fields such as the insurance business where salespeople need to enter and display data, such as customer information, when they visit customers.

This type of handwritten character entry apparatus comprises a display device such as a liquid-crystal display and a transparent touch panel attached thereon which, when touched with a pen or the like, can recognize the position of the pen on the panel. In handwritten character entry mode, an input pad, including a character entry box of 6 characters×2 lines, for example, is displayed on the display screen. When a character is written in the character entry box with a pen touching the touch panel, the touch panel detects the pen stroke and the handwritten character is displayed at that location. When a predetermined time has elapsed after removing the pen, the handwritten character is recognized and the recognized character is displayed in printed format instead of the handwritten character. If the recognition fails, "?" appears at the position where the recognized character should have been displayed. The error can be corrected by entering a handwritten character over again in the character entry box where "?" or an erroneously recognized character is displayed. When the last character on the last line has been entered by handwriting, the character entry box automatically scrolls up to enable entry in the next line.

In the above prior art handwritten character entry apparatus, when a large number of characters are entered successively, the characters entered at the top are scrolled outside the input pad before they are recognized; as a result, when the results of recognition are displayed after finishing writing, it is not possible to confirm whether the characters have been recognized correctly. For confirmation, an extra operation has to be performed to scroll down the text manually and redisplay successively the results of the recognition of all the characters on the input pad. This increases the complexity of the operation required to confirm the results of character recognition, which is especially a problem when a large number of characters have to be entered. Further, when the redisplayed results show that the characters are recognized correctly, the user may feel that the trouble taken to redisplay the results has been wasteful.

Furthermore, since, in the prior art apparatus, only a portion of the input data can be shown on the screen at once, it is difficult to grasp the whole content of the input data from the display on the input pad. In particular, when entering a large number of characters, the user may lose track of the point where he finished entering. To confirm the input contents, the user has to scroll the screen up and down, as in the above case. If the screen is scrolled, however, since only a portion of the input contents can be displayed on the input pad, it is difficult to grasp the whole content of the input data.

Also, when correcting an unrecognizable character, since it is difficult to grasp the whole input content, the input pad has to be scrolled to confirm which character is to be corrected.

SUMMARY OF THE INVENTION

It is an object of the present invention to provide a handwritten character entry method and apparatus that enable the user to grasp the input content and verify the results of character recognition without having to scroll the screen.

According to the present invention, there is provided a handwritten character entry method comprising the steps of: recognizing a handwritten character written in a first area and converting the character to character data; upon recognition of each handwritten character, outputting the character represented by the character data to the first area to replace the handwritten character written therein; and upon recognition of each handwritten character, outputting the character represented by the character data to a second area capable of accommodating more characters than can be shown in the first area at once.

According to the present invention, there is also provided a handwritten character entry apparatus comprising: means for recognizing a handwritten character written in a first area and for converting the character to character data; means for outputting, upon recognition of each handwritten character, the character represented by the character data to the first area to replace the handwritten character written therein; and means for outputting, upon recognition of each handwritten character, the character represented by the character data to a second area capable of accommodating more characters than can be shown in the first area at once.

BRIEF DESCRIPTION OF THE DRAWINGS

FIGS. 3 to 7 are diagrams showing examples of screens displayed on an LCD display of the portable terminal;

DESCRIPTION OF THE PREFERRED EMBODIMENTS

Figure 1:
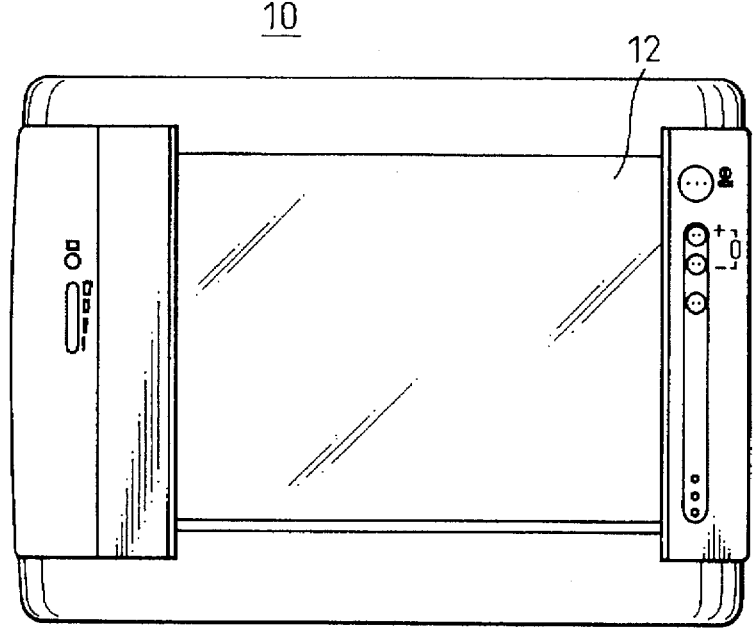
FIG. 1 is a top plan view of a portable terminal having a handwritten character entry function according to one embodiment of the present invention.

FIG. 1 is a top plan view of a portable terminal 10 having a handwritten character entry function according to one embodiment of the present invention. The portable terminal 10 has an LCD display 12 whose surface is covered with a tablet constructed from a transparent touch panel. When the surface of the tablet is touched with a pen or the like, the x, y coordinates of the touched position are detected.

Figure 2:
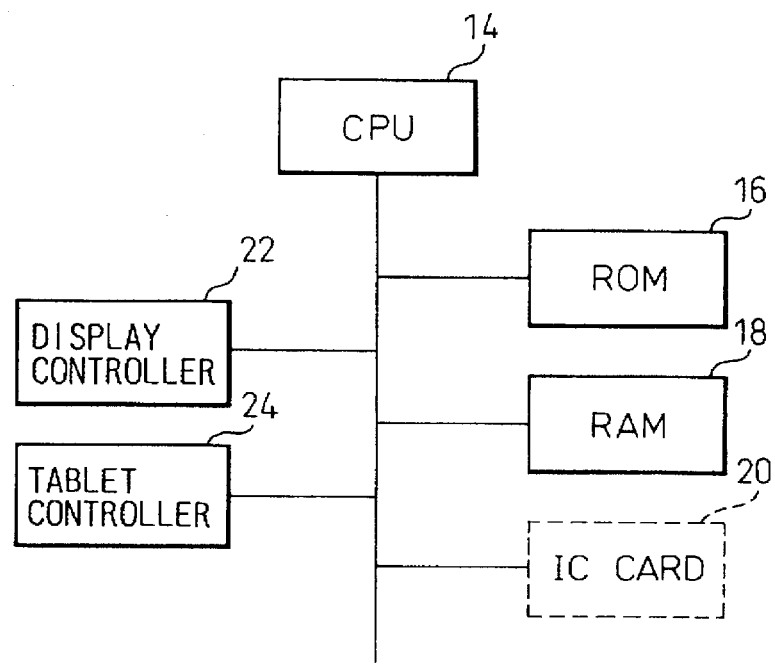
FIG. 2 is a block diagram showing a simplified form of the hardware configuration of the portable terminal.

FIG. 2 is a block diagram showing a simplified form of the hardware configuration of the portable terminal 10. Connected to a CPU 14 are: a ROM 16 holding a basic input/output control program and operating system program; a RAM 18 for storing an application program loaded from an IC card 20; a display controller 22 for controlling the display output to the LCD display 12; and a tablet controller 24 for controlling the tablet.

FIGS. 3 to 7 show examples of screens displayed on the LCD display 12.

Figure 3:
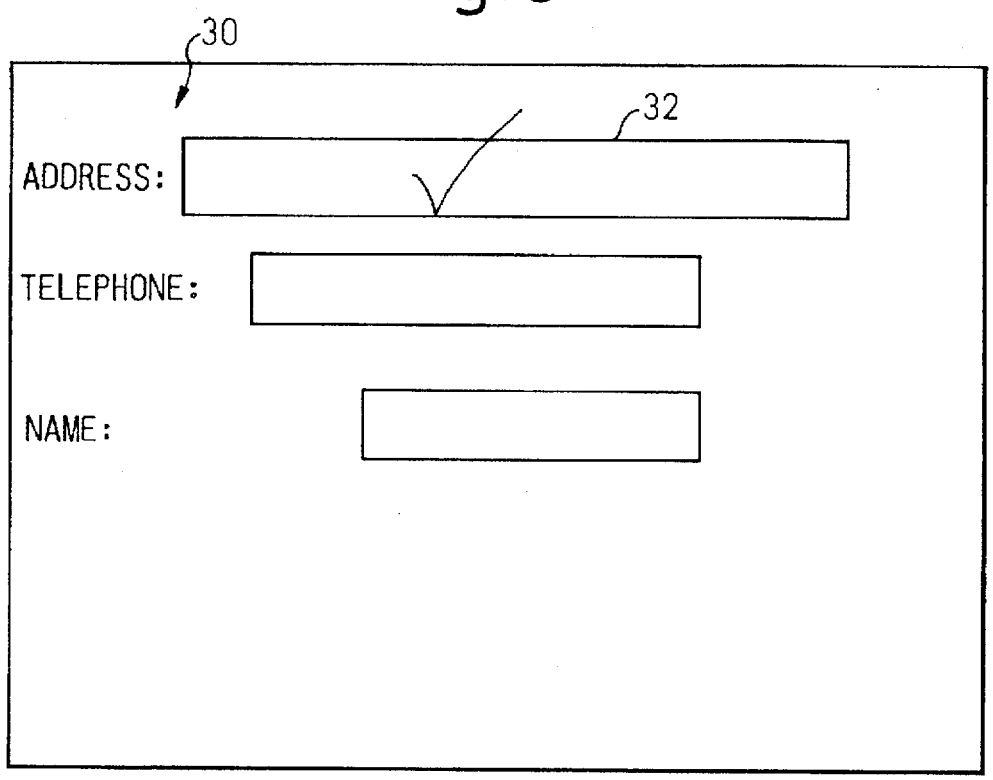

As shown in FIG. 3, the screen contains an address field 30 where customer's address is displayed. The size of the address field 30 is predetermined so that an address of normal length can be accommodated within the field. The screen also contains such fields as customer namer telephone number, etc.

Figure 4:
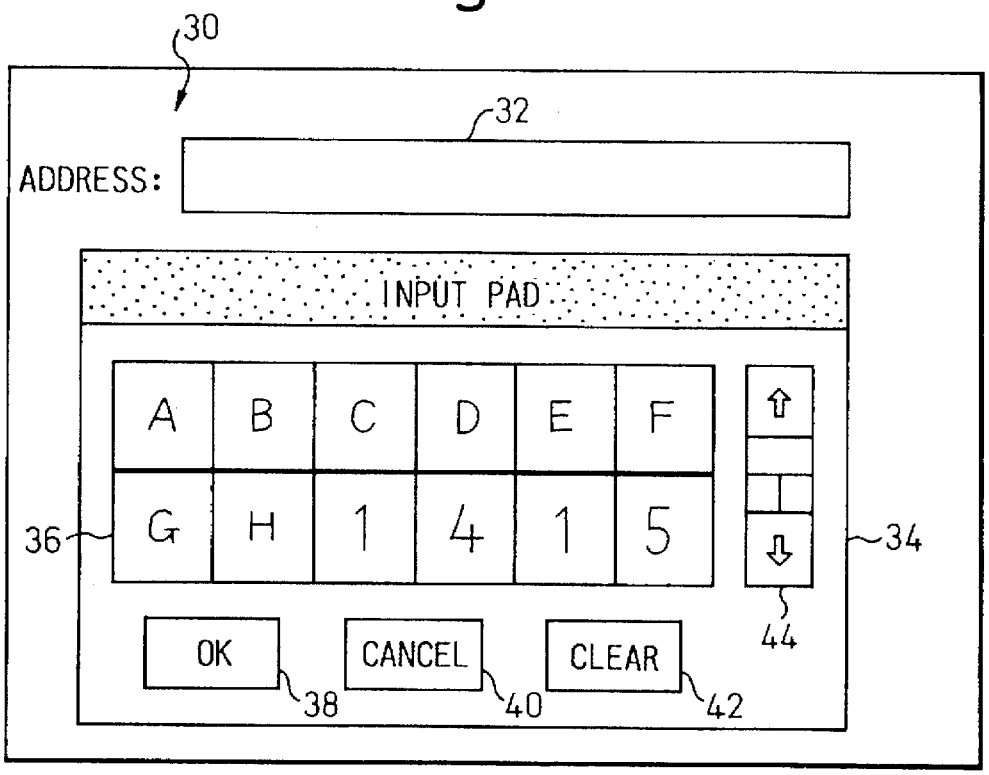

To open an input pad, the user activates the display area 32 of the address field 30. In one example of operation, the user checks the display area 32 of the address field 30 with an input pen, as shown in FIG. 3, to open an input pad. In another example of operation, an input pad open button may be provided which is depressed to open an input pad. With the input pad open operation, the user is presented on the screen with an input pad 34 having a display area 36, an OK button 38, a cancel button 40, a clear button 42, and a scroll bar 44, as shown in FIG. 4.

Next, the user writes a customer address in the display area of the input pad 34 by using the input pen. The handwritten characters thus entered are displayed in the display area, as shown in FIG. 4. The scroll bar 44 has upward and downward scroll arrows; when either scroll arrow is pressed with the input pen, the data shown in the display area 36 scrolls in the direction of the scroll arrow.

Figure 5:
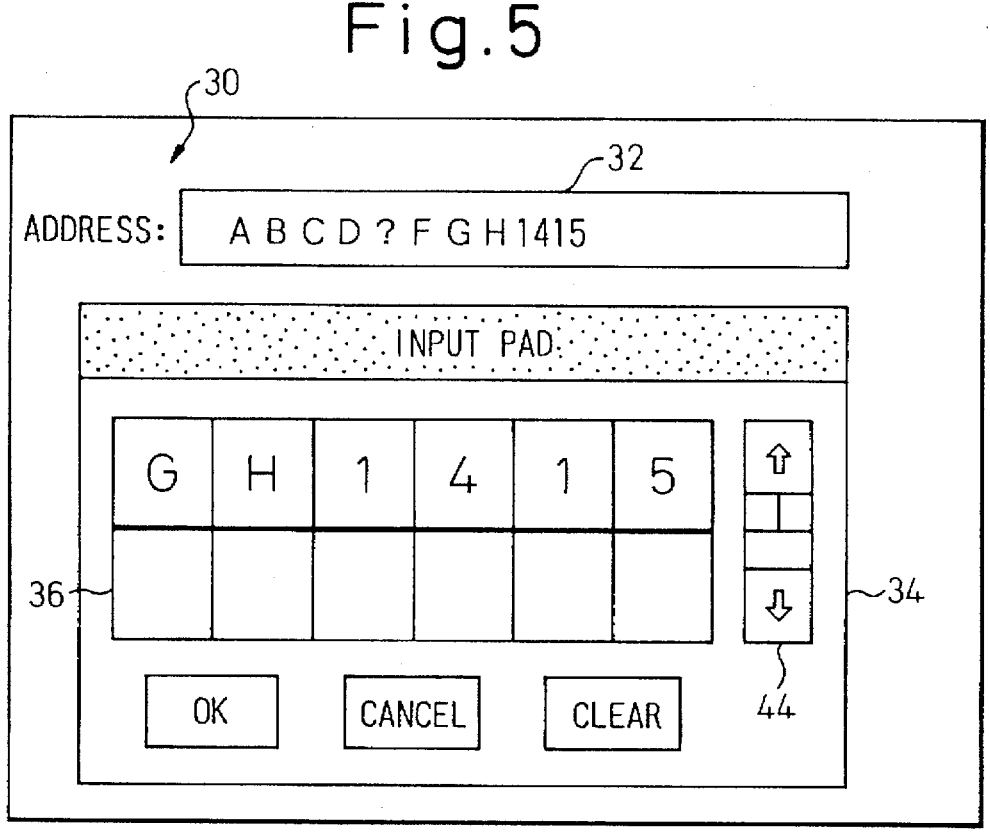

When the input pen is removed and is held off the display area 36 of the input pad 34 for more than a predetermined time, the handwritten characters entered are recognized and the recognition results are displayed in the display area 30 of the address field 32 as well as in the display area 36 of the input pad 34 (FIG. 5). When the display area 36 becomes full of entered data, the screen automatically scrolls and new character entry boxes appear, with some of the already entered characters disappearing from the display area 36 of the input pad 34, as shown in FIG. 5.

The recognized character data are displayed in the display area 32 of the address field 30 after single-byte/double-byte editing processing which will be described later. The display area 32 of the address field 30 can accommodate more characters than can be shown in the display area 36 of the input pad 34, so that the characters, if scrolled outside the display area 36 of the input pad 34, remain displayed in the display area 32 of the address field 30. If the characters to be displayed in the address field 30 are entered as single-byte characters, more characters can be accommodated within the field than when the characters are entered as double-byte characters. This is particularly advantageous when the number of characters to be entered from the input pad is large.

As shown in FIG. 5, any character that was not recognized is displayed as "?" in the display areas 36 and 32 of the input pad and the address field. If the unrecognizable character has disappeared from the display area 36 as a result of automatic scrolling, since it remains displayed in the display area 32 of the address field 30, the user can check the result of recognition without having to scroll back the display area 36 of the input pad 34. Further, since more characters can be displayed in the display area 32 of the address field than in the display area 36 of the input pad, it is easy for the user to correct an unrecognizable character that has been automatically scrolled outside the display area 36 as shown in FIG. 5, since he can bring the unrecognizable character into the display area 36 by operating the scroll bar 44. When the correct character is entered at the position of "?" shown in the display area 36, the entered character is processed for recognition once again.

Figure 15:
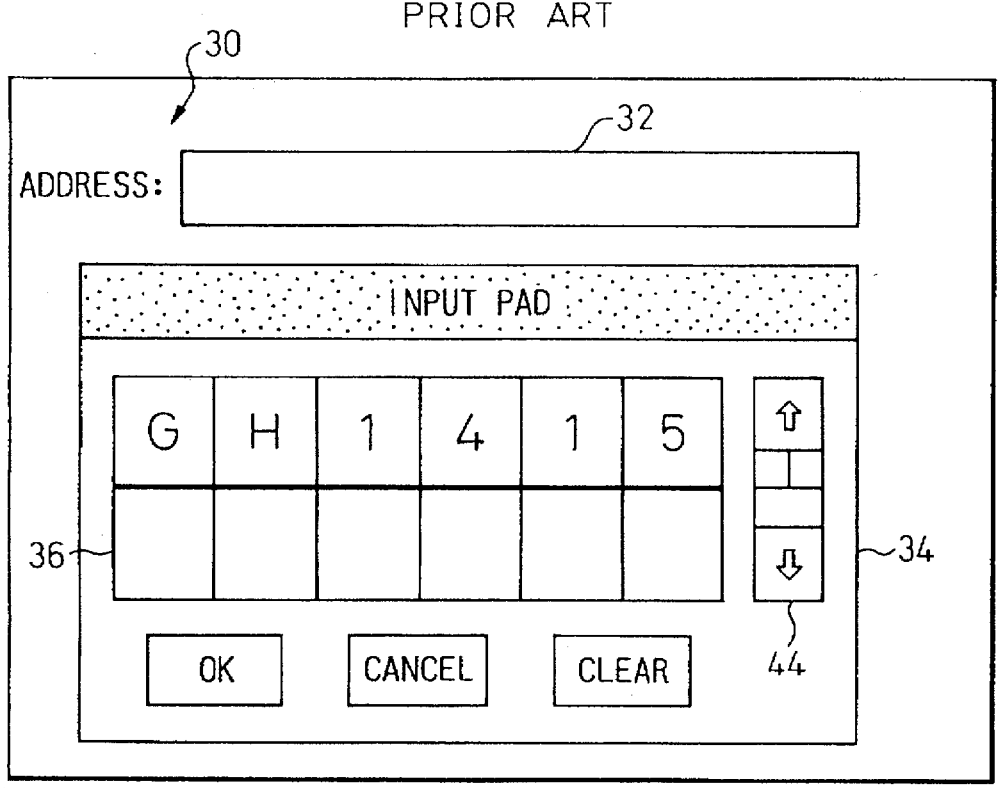
FIG. 15 is a diagram showing a screen in the prior art.

On the other hand, in the prior art, since the result of recognition is not displayed in the display area 32 of the address field 30 as shown in FIG. 15, the user cannot check the result of recognition unless the user scrolls back the display area 36 of the input pad 34.

Figure 6:
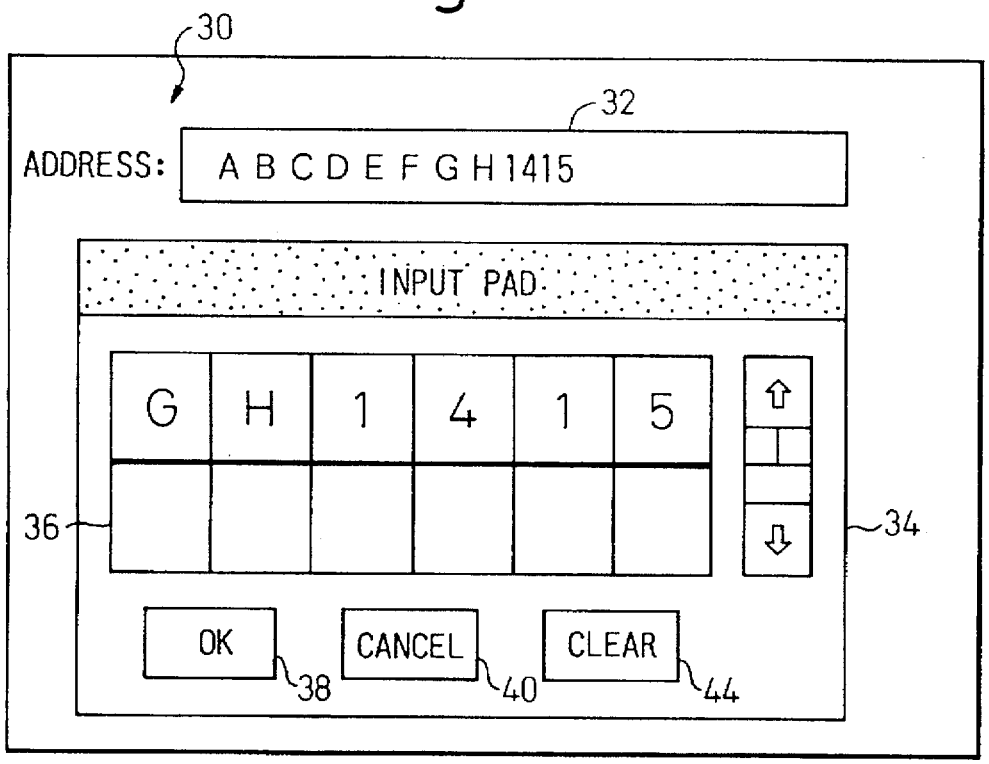

After thus entering the character to correct the unrecognizable character, if the character is recognized correctly, the correct character, for example, "E", is now displayed, as shown in FIG. 6, at the position in the display area 32 where "?" was displayed. If no unrecognizable characters occur, the screen display is the same as that shown in FIG. 6.

Figure 7:
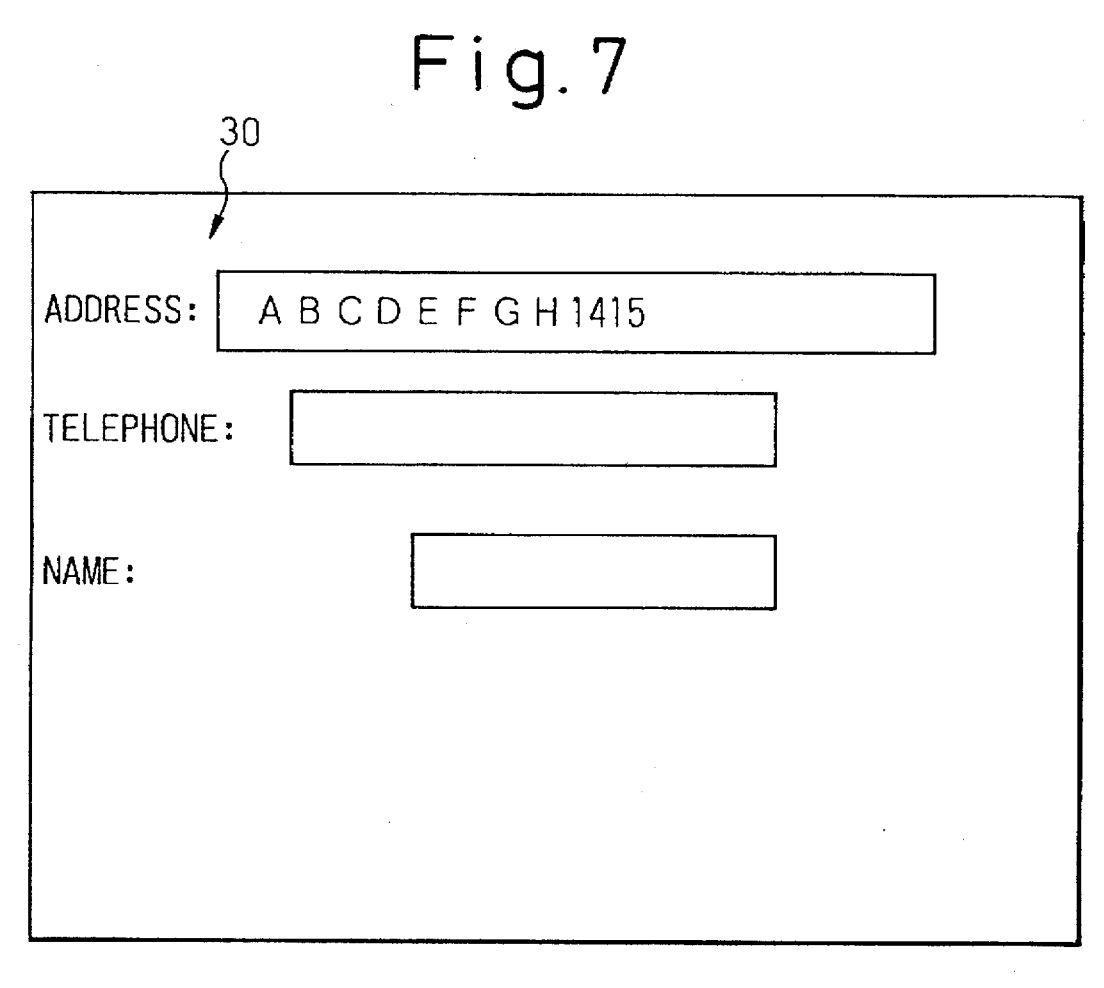

After confirming the correct entry of the address from the displayed contents of the address field 30, the user operates the OK button 38 with the input pen to close the input pad 34. When the OK button 38 is operated, the input pad 34 is closed and the display returns to the parent screen where the address field 30, etc. shown in FIG. 7 are displayed.

On the other hand, to cancel the entered data, the user operates the cancel button 40. To erase entered data, the user operates the clear button 42.

Figure 8:
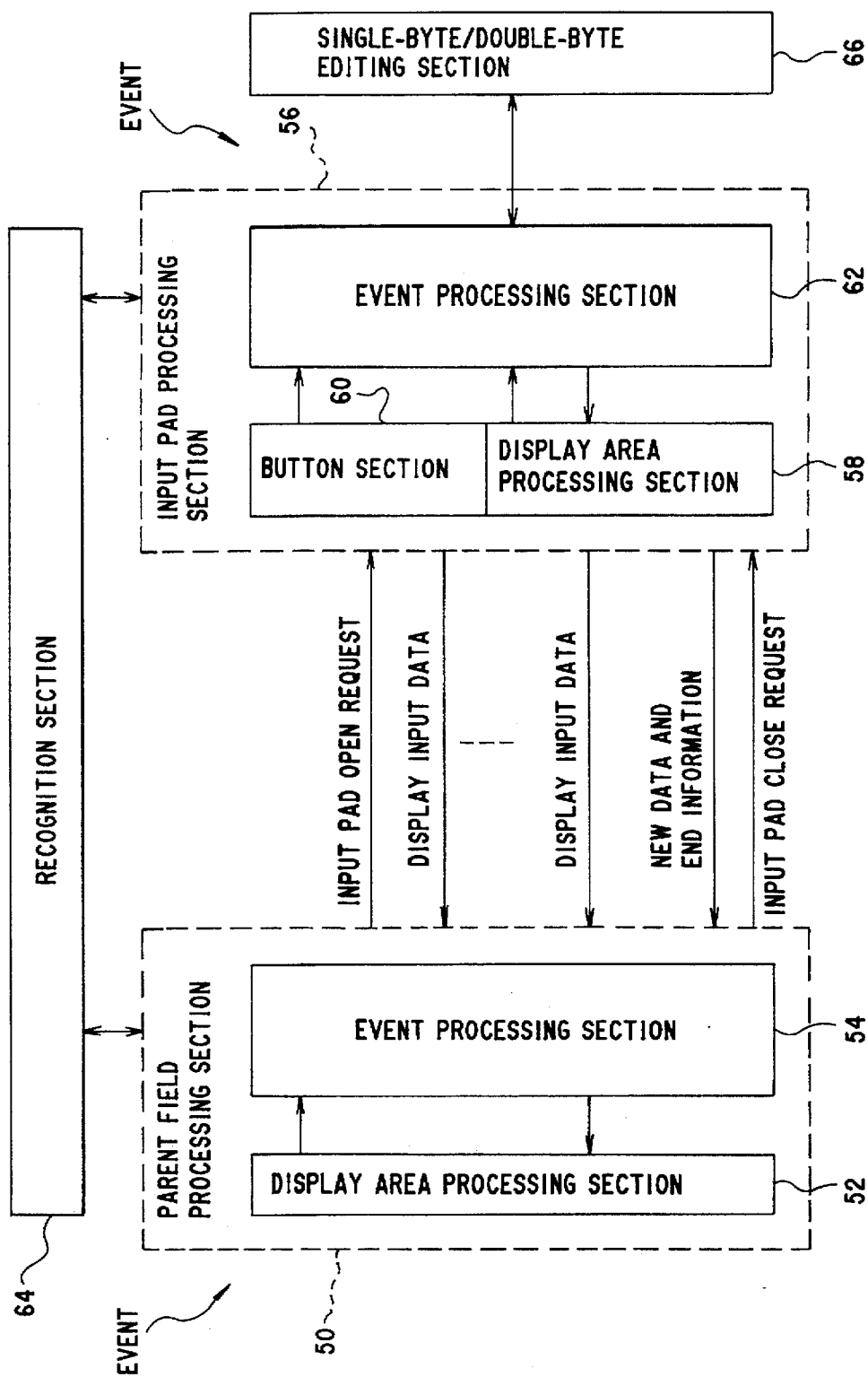
FIG. 8 is a block diagram showing the configuration of an application program.

FIG. 8 is a block diagram showing the configuration of an application program implementing the above processing. A parent field processing section 50 consists of a display area processing section 52 for controlling the input/output to and from the display area 32 of the address field 30, and an event processing section 54 for performing processing according to an event occurring to the field 30. An input pad processing section 56 consists of a display area processing section 58 for controlling the input to and output from the display area 36 of the input pad 34, a button controlling section 60 for controlling the input to and output from the buttons 38, 40, and 42, and an event processing section 62 for performing processing according to an event occurring to the input pad 34. A recognition processing section 64 is responsible for the evaluation of operations performed on the address field 30 as well as the recognition of handwritten characters entered at the display area 36 of the input pad 34. A single-byte/double-byte editing section 66 edits the character data recognized by the recognition processing section 64 and converts it to character data representing a single-byte character or a double-byte character.

Figure 9:
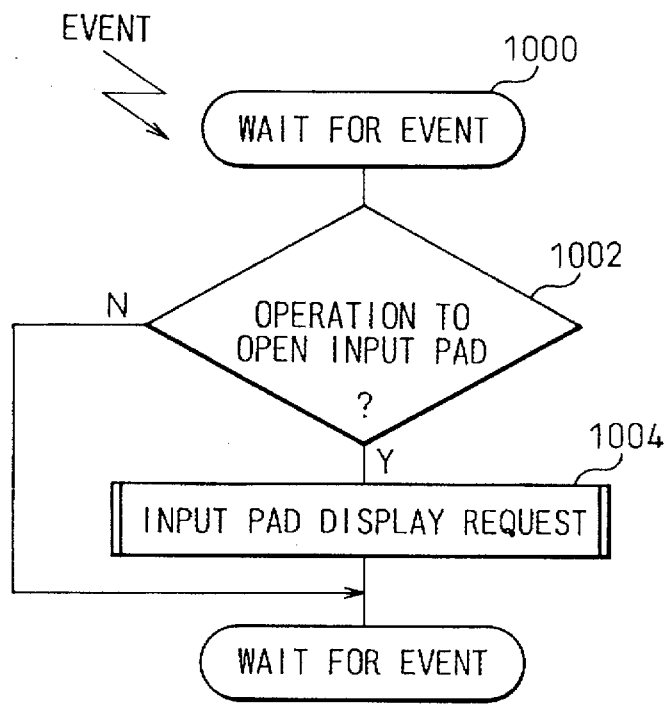
FIGS. 9 to 14 are flowcharts illustrating the operation of the portable terminal.

The operation of the program will now be described with reference to the flowcharts shown in FIGS. 9 to 14. FIG. 9 is a flowchart illustrating the processing when an operation to open the input pad 34 is performed from the screen of FIG. 3 or 7. The initial state is an event waiting state (step 1000).

In this state, when an operation is performed on the address field 30, judgement is made as to whether the operation is for opening the input pad (step 1002). To make this judgement, the event processing section 54 makes an inquiry to the recognition processing section 64 as to whether the accepted input is for opening the input pad. In response to the inquiry from the event processing section 54, the recognition processing section 64 judges the input contents. When a check mark, such as the one shown in FIG. 3, is input, the recognition processing section 64 judges that an operation to open the input pad has been performed.

In accordance with the contents notified from the recognition processing section 64, the event processing section 54 transfers various parameters to the input pad processing section 56 and requests the presentation of the input pad (step 1004).

The parameters include: field ID that serves as the key to identify the field to be processed when there are a plurality of fields such as name and address; data currently displayed in the display area 32 of the address field 30; input pad display position where the input pad is to be displayed without overlapping with other fields; single-byte/double-byte character editing data indicating whether the input data recognized on the input pad should be edited as single-byte characters or double-byte characters for display in the display area of the address field or whether the data as recognized on the input pad should be displayed unchanged; and the maximum number of characters that can be displayed in the address field.

Figure 10:
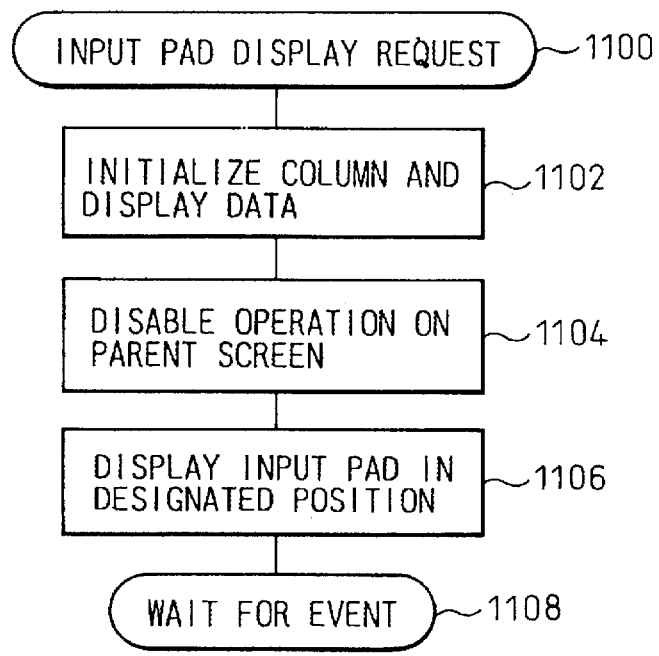

FIG. 10 is a flowchart illustrating the processing of a subroutine for opening the input pad. When a request to display the input pad 34 is accepted in step 1100, the event processing section 62 in the input pad processing section 56 initializes the display area 36 of the input pad 34 and displays in the display area 36 of the input pad 34 the current data of the address field contained in the parameters transferred from the event processing section 54 in the parent field processing section 50 (step 1102). Then, operation on the parent screen (the screen of FIG. 3), where other fields are displayed, is disabled (step 1104). Next, the event processing section 62 in the input pad processing section 56 displays the input pad 34 in the designated position on the screen in accordance with the parameter transferred from the event processing section 54 in the field processing section 50 (step 1106). After that, the input pad processing section 56 is placed in an event waiting state, waiting for the next operation to be performed by the operator.

Figure 11:
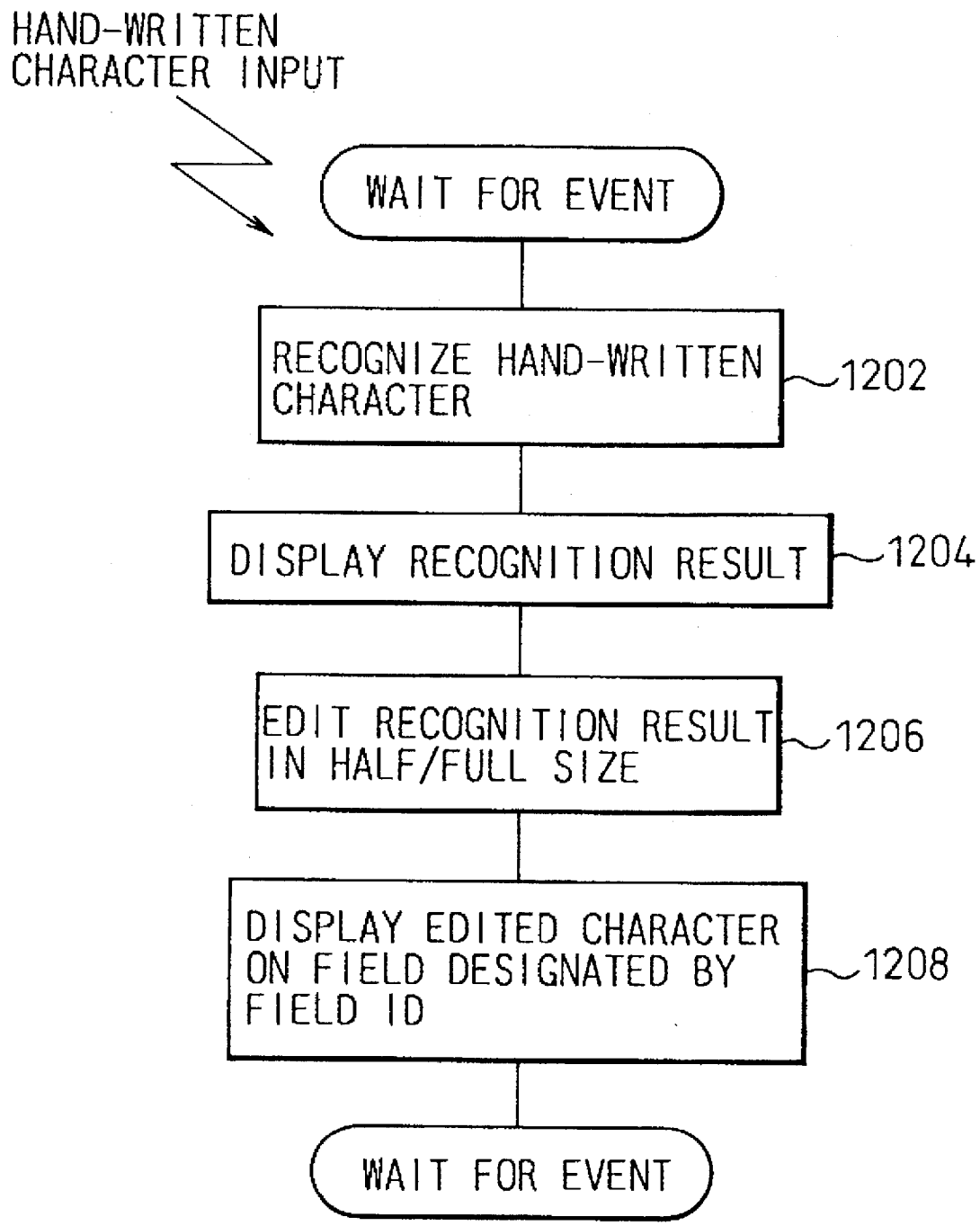

FIG. 11 is a flowchart illustrating the processing when handwriting is entered at the display area 36 of the input pad 34. In the event waiting state in FIG. 10, when a handwritten character is entered by the operator and the pen is lifted off the display area 36 of the input pad 34 for more than a predetermined time, the input contents are transferred from the event processing section 62 to the recognition processing section 64. The recognition processing section 64 then performs character recognition to convert the input data to character data (step 1202). The result of recognition is transferred to the display area processing section 58 via the event processing section The display area processing section 58 displays the result of recognition, transferred via the event processing section 62, in the display area 36 of the input pad 34 (step 1204). Next, the event processing section 56 transfers the input data displayed in the display area 36 to the single-byte/double-byte editing section 66, together with the single-byte/double-byte character editing data transferred from the field processing section 50 when the input pad was opened.

Upon receiving the data from the event processing section 56, the single-byte/double-byte editing section 66 edits the character data, displayed in the display area 36, as single-byte or double-byte characters according to the transferred contents (step 1206). The edited character data is transferred back to the event processing section 62.

Upon reception of the data from the single-byte/double-byte editing section 66, the event processing section 62 displays the data, as edited by the single-byte/double-byte editing section 66, in the display area 32 of the address field 30 indicated by the field ID notified when the input pad was opened (step 1208). After that, the event processing section 62 is again placed in the event waiting state.

As described above, for each character entry at the input pad, the input pad processing section 56 recognizes and edits the input data, and displays the resulting data in the display area 32 of the address field 30.

Figure 12:
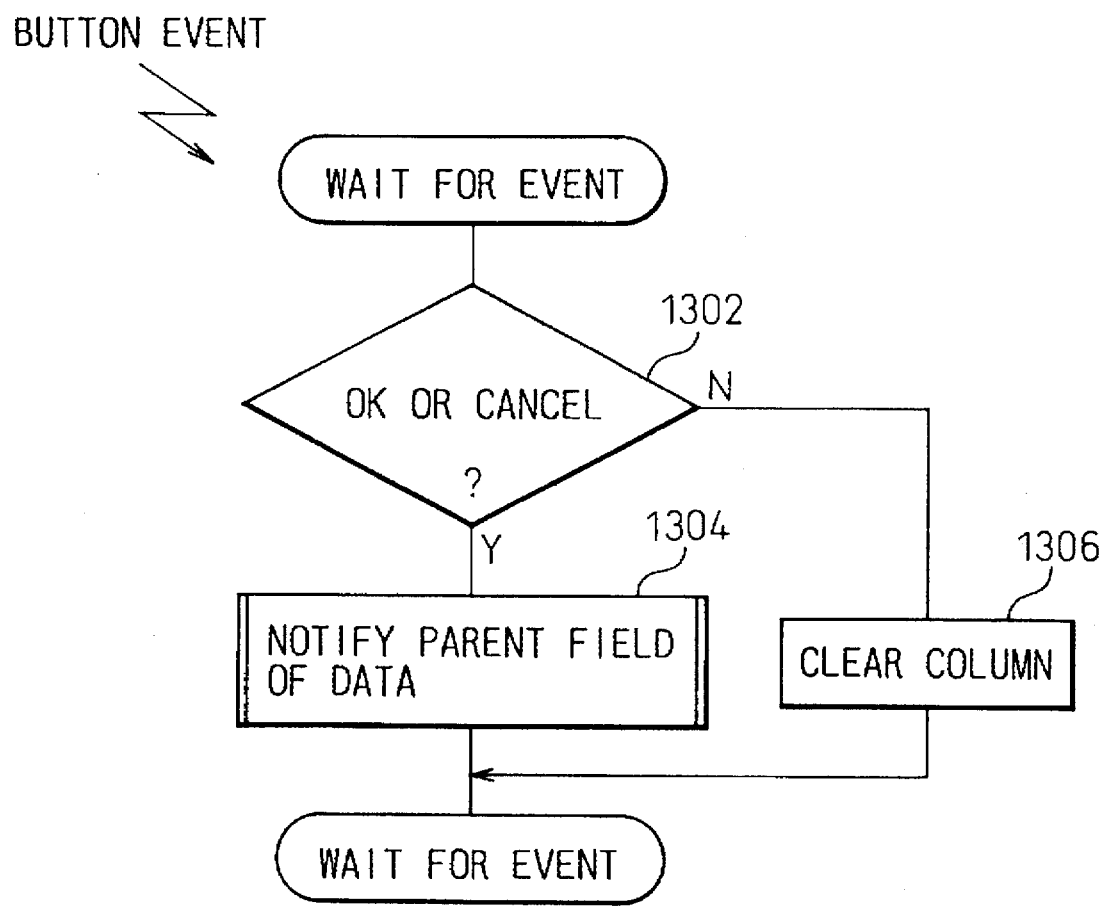

FIG. 12 is a flowchart illustrating the processing when any of the buttons 38, 40, 42 on the input pad is operated.

When one of the buttons is operated in the event waiting state, the event processing section 62 judges whether the button operated by the operator with the input pen is either the OK button 38 or the cancel button 40 (step 1302).

When the operated button is either the OK button 38 or the cancel button 40, the contents of the operated button is notified to the field indicated by the field ID, and a subroutine for that field ID is called (step 1304).

In the processing of step 1304, if the operated button is the OK button 38, the data displayed in the display area 36 of the input pad 34 is treated as new data, and the identification number of the OK button 38 is notified as end information to the field designated by the parent field processing section 50. On the other hand, if the operated button is the cancel button 40, the data transferred as a parameter at the time of the presentation of the input pad 34 is treated as new data, and the identification number of the cancel button 40 is notified as end information to the field designated by the parent field processing section 50.

If, in step 1302, the operated button is neither the OK button or the cancel button, processing is performed according to the operated button. For example, if the operated button is the clear button 42, the display area processing section 58 clears the display area in step 1306, deleting the displayed contents. When the processing of step 1304 or step 1306 is complete, the event processing section 62 is again placed in the event waiting state.

Figure 13:
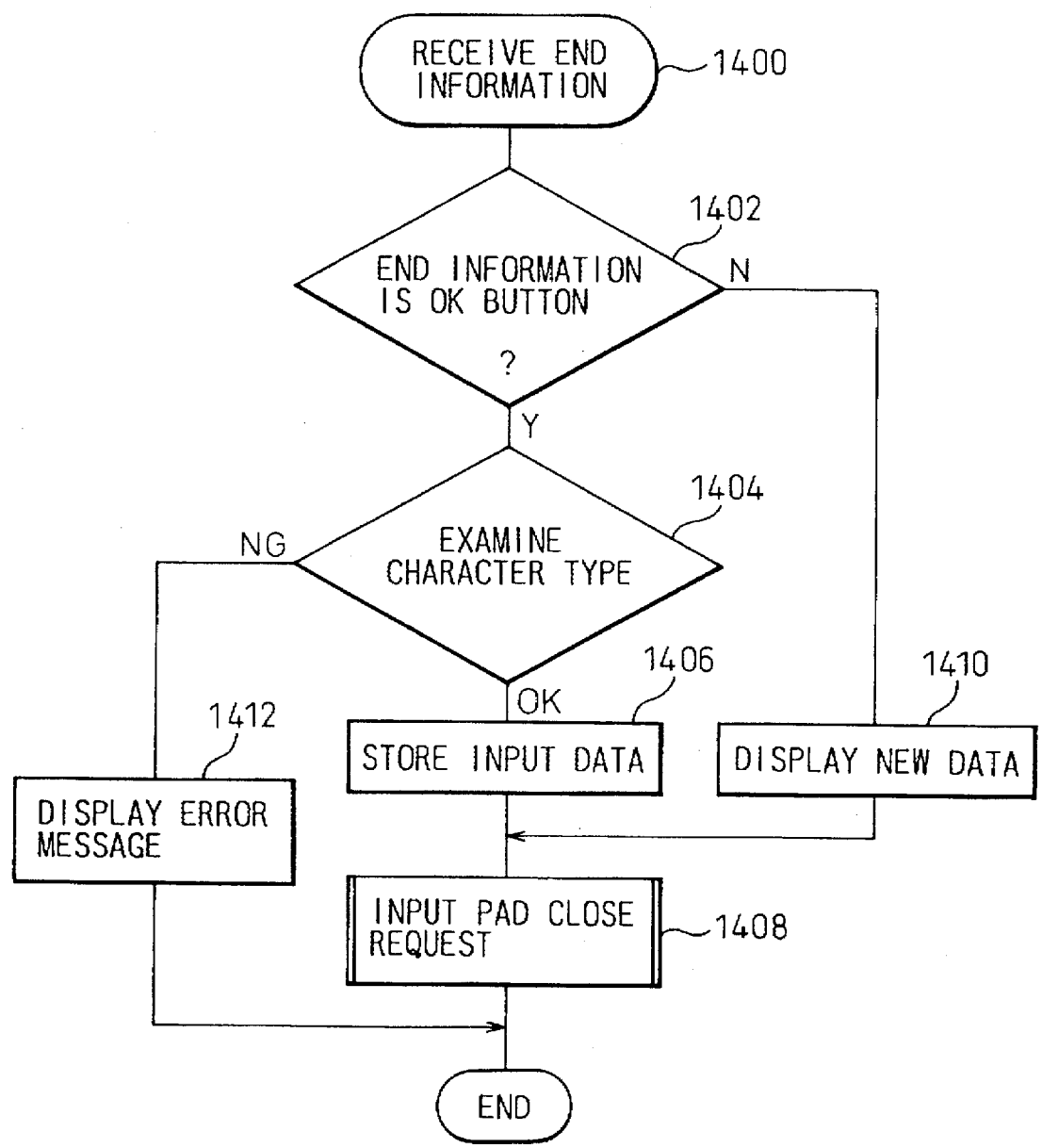

FIG. 13 is a flowchart illustrating the processing when end information is received from the input pad. When end information is accepted in step 1400, judgement is made as to whether the end information is from the OK button 38 (step 1402). This judgement is made based on the identification number of the operated button. If the operated button is the OK button 38, the entered characters are determined and the character type of the input data is examined.

For the address field, all character types are usable and the result of the character type check is always OK. On the other hand, for other fields such as a kana field that allows entry of kana characters only, a check is made for the possibility that kanji characters are included in the entered characters (step 1404). If the result of the check is NG, an error message is displayed (step 1412), and the input pad remains open.

If the result of the check is OK, the character data is stored in internal storage so that the character data displayed in the display area 32 of the address field 30 can be handled as internal data (step 1408). Then, a request to close the input pad 34 is sent to the input pad processing section 56 (step 1408).

On the other hand, if it is judged in step 1402 that the end information is not from the OK button 38, new data will be displayed in the display area 32 of the address field 30 (step 1410). For example, if the end information is from the cancel button 40, the contents that was displayed before the input pad 34 was opened will be displayed on the screen in step 1410. When the processing of step 1406 or step 1410 is complete, the input pad 34 is erased from the screen to terminate the processing.

Figure 14:
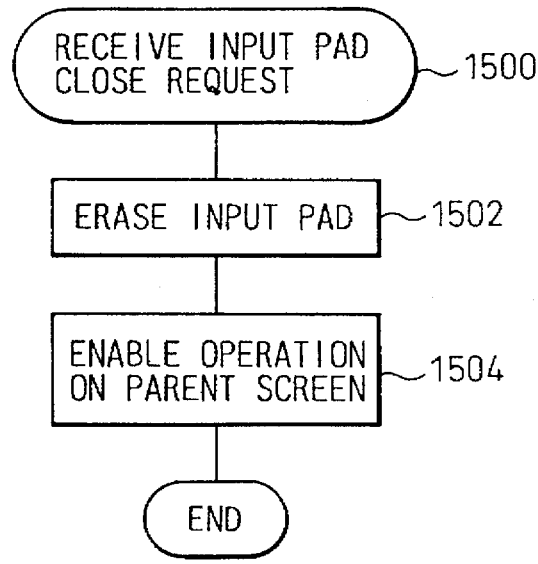

FIG. 14 is a flowchart illustrating the processing for closing the input pad 34. When a request to close the input pad 34 is accepted in step 1500, the input pad 34 is erased from the screen in step 1502. Next, processing is performed to enable operation on the parent screen, i.e., the screen that was displayed before the input pad 34 was opened (step 1504). With the above processing, the input pad 34 is erased and the display returns to the parent screen showing the address field 30, etc.

As described, according to the present invention, even if the screen is scrolled when entering data such as characters from the input pad, it is easy to grasp the content of input data and confirm the results of character recognition. In particular, simultaneous display of the same data on the input pad and in the data display field greatly facilitates the confirmation of the input contents and the verification of the results of character recognition, eliminating cumbersome procedures of data entry with character entry apparatus. Furthermore, since the size of each character to be displayed in the data display field can be edited as needed, it is possible to adjust the maximum number of characters that can be accommodated in the data display field. This feature allows the entered characters and the results of character recognition to be viewed in the data display field for confirmation even when a large amount of data must be entered from the input pad.

We claim:

1. A handwritten character entry method comprising the steps of:

recognizing that handwritten characters are written in a first area and converting said handwritten characters to character data, said handwritten characters possibly scrolled outside the first area before recognition;

upon recognition of each handwritten character, outputting a character represented by said character data to said first area to replace said handwritten characters written therein;

upon recognition of each handwritten character, outputting the character represented by said character data to a second area capable of accommodating more characters than can be shown in said first area at once; and upon non-recognition of each handwritten character, outputting a character representing non-recognition to said first area to replace said handwritten characters written therein and outputting the character representing non-recognition to the second area.

2. A method according to claim 1, wherein said first area and said second area are displayed simultaneously on the same screen.

3. A method according to claim 2, further comprising the step of editing the character, to be output to said second area, as a single-byte character or a double-byte character.

4. A handwritten character entry apparatus comprising:

means for recognizing that handwritten characters are written in a first area and for converting said handwritten characters to character data, said handwritten characters being possibly scrolled outside the first area before recognition;

means for outputting, upon recognition of each handwritten character, a character represented by said character data to said first area to replace said handwritten characters written therein;

means for outputting, upon recognition of each handwritten character, the character represented by said character data to a second area capable of accommodating more characters than can be shown in first area at once; and means for outputting, upon non-recognition of each handwritten character, a character representing non-recognition a) to said first area to replace said handwritten characters written therein and b) to said second area.

5. An apparatus according to claim 4, wherein said first area and said second area are displayed simultaneously on the same screen.

6. An apparatus according to claim 5, further comprising means for editing the character, to be output to said second area, as a single-byte character or a double-byte character.

7. A handwritten character entry method comprising the steps of:

inputting handwritten characters in a first area using a writing means;

scrolling said first area when said first area is full;

recognizing said handwritten characters written in said first area after a predetermined time has elapsed after removing said writing means for writing said handwritten characters, said predetermined time being independent of scrolling of said first area and converting said handwritten characters to character data;

upon recognition of each handwritten character, outputting a character represented by said character data to said first area to replace said handwritten characters written therein;

upon recognition of each handwritten character, outputting the character represented by said character data to a second area capable of accommodating more characters than can be shown in said first area at once; and upon non-recognition of each handwritten character, outputting a character representing non-recognition to said first area to replace said handwritten characters written therein and outputting the character representing non-recognition to the second area.

8. A handwritten character entry apparatus comprising:

means for recognizing handwritten characters written in a first area after a predetermined time has elapsed after removing a writing means for writing said handwritten characters and for converting said characters to character data;

means for outputting, upon recognition of each handwritten character, a character represented by said character data to said first area to replace said handwritten characters written therein;

means for outputting, upon recognition of each handwritten character, the character represented by said character data to a second area capable of accommodating more characters than can be shown in said first area at once;

means for outputting upon non-recognition of each handwritten character, a character representing non-recognition a) to said first area to replace said handwritten characters written therein and b) to said second area; and scrolling means for scrolling said first area when said first area is full, wherein said predetermined time being independent of scrolling of said first area.

* * * * *